United States Patent
Cabo

[11] Patent Number: 5,820,991
[45] Date of Patent: Oct. 13, 1998

[54] FUSED GLASS SHEETS HAVING CERAMIC PAINT AND METAL FOIL AND METHOD OF MAKING SAME

[76] Inventor: Ana M. Cabo, 2003 6th St., Santa Monica, Calif. 90404

[21] Appl. No.: 803,828

[22] Filed: Feb. 24, 1997

[51] Int. Cl.$^6$ .................................................. B32B 9/00
[52] U.S. Cl. .................... 428/432; 428/34; 428/210; 428/325; 428/426; 428/433; 428/539.5; 428/689; 428/697; 428/913; 427/108; 427/118; 427/269; 427/419.3; 65/60.1; 65/60.2; 65/60.52
[58] Field of Search .................. 428/210, 325, 428/432, 433, 539.5, 689, 697, 426; 65/60.1, 60.5, 60.52, 60.2; 427/118, 108, 376.3, 269, 419.3

[56] References Cited

U.S. PATENT DOCUMENTS

| | | | |
|---|---|---|---|
| 3,852,148 | 12/1974 | Pryor et al. | 161/41 |
| 4,339,257 | 7/1982 | Ueda | 65/60.5 |
| 4,596,590 | 6/1986 | Boaz | 65/60.51 |
| 4,684,389 | 8/1987 | Boaz | 65/60.5 |
| 4,770,685 | 9/1988 | Boaz | 65/106 |
| 4,837,383 | 6/1989 | Andrews | 427/108 |
| 4,857,096 | 8/1989 | Boaz | 65/60.51 |
| 5,120,570 | 6/1992 | Boaz | 427/45.1 |
| 5,328,753 | 7/1994 | Boaz | 428/210 |

*Primary Examiner*—William Krynski
*Assistant Examiner*—Abraham Bahta
*Attorney, Agent, or Firm*—Louis L. Dachs

[57] ABSTRACT

The invention is a composite glass sheet and method of making same. In detail, the composite glass sheet includes first and second translucent ceramic layers, having one principle side coated with ceramic paint, and a sheet of metal foil positioned between the coated sides with the whole assembly fused together. The method includes the steps of: providing first and second sheets of translucent glass having first and second principle sides; coating at least a portion of the first principle sides of the first and second sheets with a layer of ceramic paint; providing a sheet of metal foil between the coated first principle surfaces forming an assembly; and heating the assembly to a sufficient temperature for a sufficient time such that the first and second coated sheets of glass and the metal foil are all fused together.

22 Claims, 1 Drawing Sheet

FIG. 1
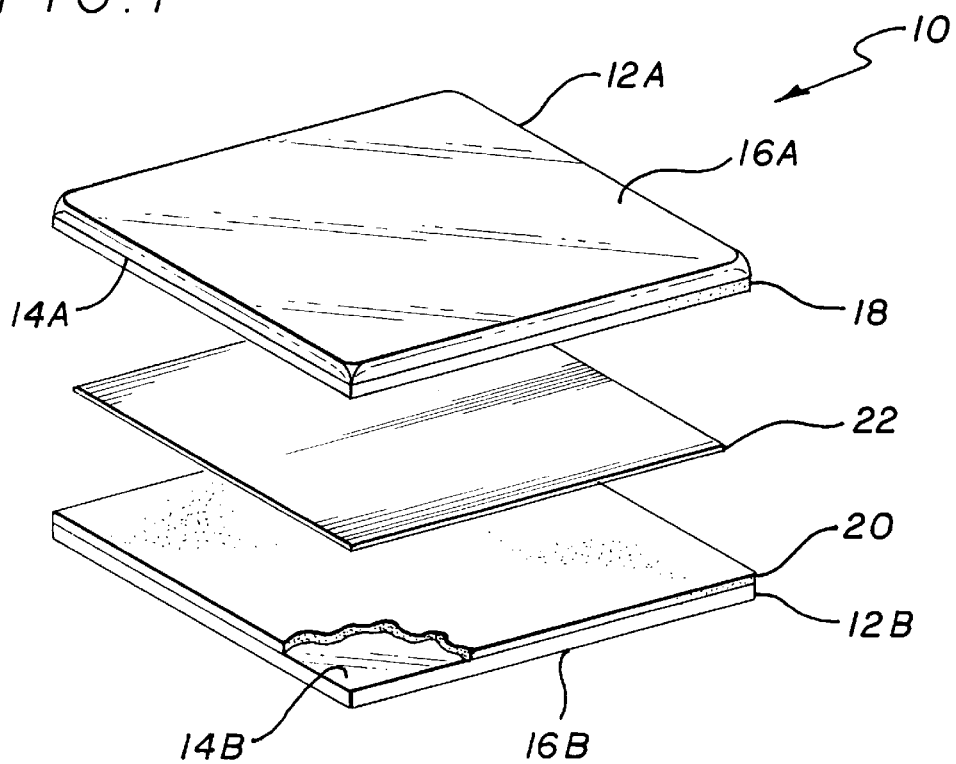
FIG. 2
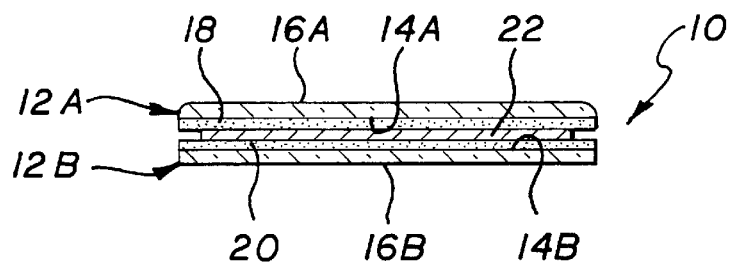
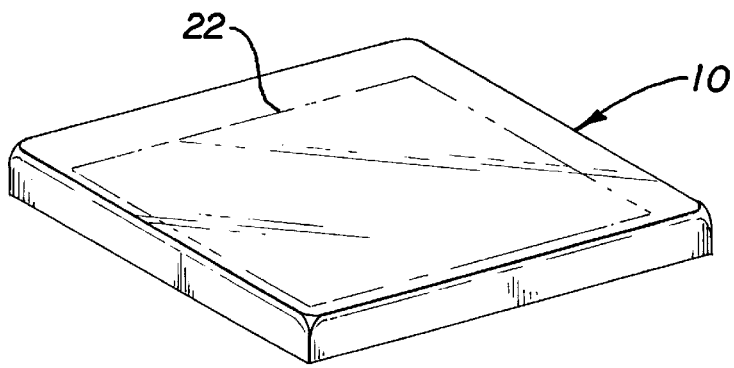
FIG. 3

FUSED GLASS SHEETS HAVING CERAMIC PAINT AND METAL FOIL AND METHOD OF MAKING SAME

BACKGROUND OF THE INVENTION

1. Field of the Invention

The invention relates to the field of glass products, and, in particular to glass products incorporating metal foils and a method of making same.

2. Description of Related Art

Metals are incorporated into glass for many purposes; for example, it is well known to embed wire into glass in architectural glazing for reinforcement purposes. Metal foils, as well as vapor deposition of metals on the outer surfaces of architectural glazing is used for reducing the transmission of light and ultraviolet radiation. However metal foils are not commonly embedded in-between fused glass sheets; because the metal foils oxidize in the heating process necessary to fuse the glass cover sheets together. It is also well known to use ceramic paints in the form of glass frits to coat the surface of glass sheet or at least a portion thereof with glass frits. For example, in the U.S. Pat. No. 5,328,753 "Glass Sheet Having Painted Exterior Surfaces" by T. Boaz discloses a process for painting the exterior surface of a glass sheet by applying consecutive layers of metal-containing ceramic paint and an organic paint. The coated glass sheet is then heated to a plastic set temperature, a temperature wherein the glass is capable of being permanently bent, but a temperature below which an applied stress will not cause permanent deformation, such that the ceramic paint is fused to the glass. U.S. Patent Nos. 4,596,590 "Method Of Forming A Glass Sheet With A Ceramic Paint Thereon", 4,684,389 "Method Of Forming A Glass Sheet With An Oil based Ceramic Paint Thereon", 4,770,685 "Method Of Manufacturing Formed Glass Sheet With Paint Thereon" and 4,857,096 "Method Of Forming A Glass Sheet With A UV-Base Ceramic Paint", all by P. T. Boaz all disclose a method of forming glass sheet with multilayers of ceramic paint thereon and compositions thereof. Another example of applying ceramic paints to glass sheet can be found in U.S. Pat. No. 4,339,257 "Method Of Producing Curved And Partly Colored Glass Sheet by K. Ueda also discloses a method of forming glass sheet with glass frit coatings. Of additional interest is U.S. Patent Nos. 4,837,383 "Glass Enamel" by R. Andrews which discloses a formulation for an enamel opaque useful in providing an opaque border for both automotive and architectural glazing.

It is also well established that metal foils can be coated with ceramic paints containing glass frits. For example, U.S. Pat. No. 3,852,148 "Architectural Products Formed Of Glass Or Ceramic-To-Metal Composites by M. J. Pryor, et al. discloses coating a metal foil with ceramic paints and fusing same to the metal foil. However, this provides a surface that is not sufficiently smooth to serve as a counter top surface in a bar or kitchen, which is subject to continuous abrasive use and cleaning using abrasive cleaning compounds. In addition, the metal foil is not self-supporting and must incorporate suitable backing members such as a polymeric foam sheet. Thus if a panel made according to the teachings of M. J. Pryor, et al were to be viewed from each side, a second coated metal foil would have to be mounted on the opposite side of the form backing. Thus this would make the cost of the finished product almost twice as costly.

Thus, it is a primary object of the invention to provide a ceramic panel or tile that incorporates a metal foil.

It is another primary object of the invention to provide a ceramic panel or tile that incorporates a metal foil that is resistant to surface abrasion.

It is a further object of the invention to provide a ceramic panel or tile that incorporates a metal foil that is self supporting.

It is a still further object of the invention to provide a self supporting ceramic panel or tile that can be viewed from both sides.

SUMMARY OF THE INVENTION

The invention is a composite glass sheet and method of making same. In detail, the composite glass sheet includes first and second translucent glass sheets, having first and second principle sides. The first principle sides are at least partially coated with ceramic paint, comprising glass frits, pigments and a carrier, that are fused to the first principle sides. The glass frit is preferably lead borosilcate or soda-lime borosilicate in a concentration between 30 to 50 percent. Preferably, the pigments are metal oxides selected from the group consisting of zinc, aluminum, tin, antimony, cadmium, chromium, lead, cobalt, copper, manganese, iron, silicon, titanium, tungsten, and bismuth oxide wherein the concentration of said metal oxide powders is between 1 and 30 percent. A layer of metal foil having first and second principle sides is bonded to the coated first principle sides of the glass sheets. Preferably, the metal foil is selected from the group consisting of copper, brass, lead, steel, zinc, titanium, silver, gold and platinum having a thickness of between 0.0001 to 0.015 inch thick. The preferred this is 0.0001 and 0.006 inch.

The method includes the steps of: providing first and second sheets of translucent glass having first and second principle sides; providing a layer of metal foil having first and second principle surfaces; coating at least a portion of the first principle sides of the first and second sheets with a layer of ceramic paint; placing the first and second sheets of coated translucent glass on to the first and second sides of the metal foil such that the coated first sides thereof are in contact with the metal foil forming an assembly; and heating the assembly to a sufficient temperature for a sufficient time such that the first and second coated sheets of glass and the metal foil are fused together.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is an exploded perspective view composite glass sheet.

FIG. 2 is cross-sectional view of the composite glass sheet shown in FIG. 1 after fusing together.

FIG. 3 is a perspective view of the the completed composite glass sheet.

DESCRIPTION OF THE PREFERRED EMBODIMENT

In FIGS. 1 and 2, a composite glass sheet assembly is illustrated, generally indicated by numeral 10, and which includes translucent glass sheets 12A and 12B having first and second principle sides 14AB and 16AB, respectively.

The first principle surfaces 14A and 14B are at least partially coated with a ceramic paints 18 and 20. A metal foil 22, is embedded and bonded between the fused first principle surfaces 14A and 14B of the sheets of glass 12A and 12B.

The glass sheets 12A and 12B may be of any thickness or size. Preferable, however, the thickness range of the glass should be between a 0.03 of an inch to about 2.0 inches thick. The glass sheets 12A and 12B may be clear or be colored, but should at least be translucent. The second principle sides 16A and 16B be textured or be smooth. The coefficient of expansions of the glass sheet should be in the range of about $80 \times 10^7$ to about $125 \times 10^7$ inch/inch, preferable about $85 \times 10^7$ to about $110 \times 10^7$ inch/inch. Suitable glass includes one or more of the following principle raw materials, silica, boric oxide, soda, potash, lead oxide, lime, alumina, magnesia, barium oxide, and calcium phosphate. The glass sheets 12A and 12B can be annealed or they can be tempered after the glass sheets have been fused by the heating process or in a separate firing. This will add resistance to impact and thermal shock.

The coatings of ceramic paint 18 and 20 used on the first principle surfaces 14A and 14B of the glass sheets 12A and 12B, generally, comprise a ceramic frit, pigment, and a vehicle. Suitable ceramic frits for preparing the ceramic paints include one or more glass frits prepared from conventional bismuth alkali borosilicate, lead borosilicate glass composition, soda-lime-borosilicate-alumina composition, lead monosilicate or from a lime-boro-alumina-silicate material. Alternatively, the frit may comprise a combination of metal oxides such as those selected from the group consisting of oxides of lead, titanium, selenium, calcium carbonate, sodium, boron, lithium, iron, zirconium, potassium, zinc, calcium, alumina, tin, manganese, vanadium, molybdenum, magnesium, and the like.

The frit is prepared by melting the frit batch ingredients at temperatures from about 1,650 degrees F. to about 2,900 degrees F., and then quenching the molten frit composition either with the use of water or by pouring the melt between cooled metal rolls rotating in opposite directions. The resulting chunks of frit are then ground into fine particles so as to pass through a 325 U.S. Standard Sieve mesh screen or finer. A lead borosilicate glass frit or soda-lime-borosilicate glass frit is preferred because they are readily available and relatively inexpensive. The frit is generally added to the ceramic paint composition in a concentration from about 20 to about 80 percent by weight. Preferably, the concentration of ceramic frit in the ceramic paint is from about 30 to about 50 percent by weight.

Pigments generally comprises mixtures of metal oxides which together act as a coloring agent for the ceramic paint. These metal oxides include, but are not limited to, cobalt, manganese, iron, copper, nickel, oxides of chromium, selenium, zirconium, or tin. Mixtures of these metal oxides form various colors, as is well known in the glass making industry., Up to temperatures of about 1600 degrees F., the metal oxide pigments are non-reactive with one another, or with other compounds contained in the ceramic paint or the glass sheets. The concentration of pigment in the ceramic paint composition generally may very from 0 to about 30 percent by weight. When no pigmentation is used, the result is a substantially transparent coating which exposes the metal foil.

Metal powders which may be employed in the ceramic paint comprise but are not necessarily limited to, powders prepared from zinc, aluminum, tin, antimony, cadmium, chromium, lead, cobalt, copper, manganese, iron, silicon, titanium, tungsten, and bismuth, as well as mixtures and alloys thereof. A preferred metal powder comprises finely divided lead metal powder. The metal powder is generally present in the ceramic paint composition at a concentration from about 0 to about 40 by weight. Conventionally adjutants such as, for example, filler, thermal stabilizers, dyes, and the like, as well as mixtures thereof, may also be included in the metal-containing ceramic paint in amounts generally not exceeding 60 percent by weight of the paint. Other suitable ceramic paints include metallics and lusters which are also readily available. Particularly useful ceramic paints include but are not limited to those produced by Drakenfeld Colors, Drakenfeld Co., Washington Pa. 15301, Reusche Colors and Silver Stains, L. Reusche & Co., Newark, N.J. 07105, Satellite Colors, Satellite Textural Glazes, Logansport, La. 71049, Thompson Colors, Thompson Enamel Co. , Newport, Ky. 41072, and Hanovia Overglazes, Metallics, and Lusters, Englehard Corp., Edison, N.J. 08818.

Vehicles or carriers suitable for use in the ceramic paint composition generally compose organic materials which allow the paint to flow at application temperatures. Examples of useful vehicles include, but are not necessarily limited to water, alcohol, pine oil, vegetable oils, mineral oils, hot melt materials and the like as well as mixtures thereof. A preferred vehicle or carrier is a mixture of water and alcohol. The vehicle may comprise from about 1 to about 40 percent by weight. The coefficient of expansion of these ceramic paints must be adjusted to match the glass sheets, if other than very thin applications are intended. The changing of coefficient is accomplished by adding flux., such as a lead bridge, lead monosilicate or glass bridge. The method of changing the coefficient of expansion in the ceramic paints is well known in the glass industry. The Ceramic paints may be applied to the surface of a glass sheet utilizing conventional paint application methods, e.g., sifting, spraying, screen printing, painting and trailing. In a screen printing operation, the ceramic paint is spread across a screen superimposed over the glass sheet using a squeegee to force the paint through the screen pattern onto the surface of the glass sheet.

The metal foil 22 may comprise, but is not necessarily limited to, copper, brass, aluminum, bronze, lead, steel, titanium, silver, gold, platinum, as well as mixtures and alloys thereof. The thickness range of the metal foil 12 used is between about 0.0001 inch to about 0.015 inch thick, but is not necessarily limited to the above stated thickness range. Preferable, the metal foil thickness is about 0.0001 inch to about 0.010 inch. The metal foil has a significant effect in equalizing temperature variations across the glass sheets 12A and 12B as well as adding strength.

According to the present invention, the assembly of the glass sheets 12A and 12B having the coatings of ceramic paint 18 and 20 thereon and metal foil 22 are conveyed through a furnace wherein the glass sheets are heated to their plastic set temperature. By the term "plastic set temperature" as the term is used herein is meant that temperature below which an applied stress will not cause permanent deformation of the glass sheet, and above which the glass sheet is capable of being permanently bent or shaped. During the conveying of the assembly of glass sheets 12A and 12B, coatings of ceramic paint 18 and 20 and metal foil 22 through the furnace, they are fused together. The temperature required to fuse the glass sheets is generally from about 1200 degrees F. to about 1600 degrees F. This is significantly higher than the 950 degree temperature where the glass becomes chemically active which is necessary to create a permanent bond with the applied paint.

The time required to reach the appropriate temperature will vary in accordance to the glass thickness and coefficient of expansion. The heating, fusing and annealing temperatures are also well known in the glass industry and are dependent on the coefficient of expansion, size, and thickness of the glass sheet. The time required for fusing the coatings of ceramic paint and metal foil to the glass sheets is generally from about 1 to about 15 minutes between the firing ranges at about 950 degrees F. to about 1550 degrees F. The foil and ceramic paints at least partially oxidize at the elevated temperatures within the furnace and adhere tenaciously to the glass sheets. Since paints and metal foil are within the glass sheets 12A and 12B, they are resistant to abrasion, and the corrosive and erosive effects of atmospheric gases and vapors.

The method of manufacturing is accomplished by applying the coatings of ceramic paints 18 and 20 to the first principle surfaces 14A and 14B of the glass sheets 12A and 12B, placing the metal foil 22 between the first principle surfaces 14A or 14B, and placing the assembly into a furnace and heating to the desired temperature, and then cooling.

The initial heat is the stage which consists of heating the glass from room temperature to just above the strain point temperature. The initial heating is a slow heating range of approximately 500 degrees F. per hour. The strain point of the glass depends on the coefficient of expansion Generally, the strain point in commercially available sheet glass may range from about 775 degrees F. to about 925 degrees F. Above the strain point, the rapid heat stage may begin. The rapid heating range is about 1200 degrees F. per hour. The fusing temperature is from about 1300 degrees F. to about 1600 degrees F. Once the temperature to fuse is reached, the glass can be held at the soak temperature until the desired fusing is accomplished. The glass may be cooled rapidly down to the annealing range of about 1000 degrees F; the kiln or furnace may be opened or vented to lower the temperature. The annealing stage is the process of holding the furnace at a constant temperature for a given time for a given thickness of glass. Again, the soak times and temperatures for the glass will vary with the thickness and coefficient of expansions. Once the annealing soak time has passed, the anneal cool stage begins. This zone is bounded by the annealing soak temperature on the top end and the strain point on the lower end. Glass in this zone is slowly becoming more rigid. The more slowly the glass progresses though this zone, the less stress will appear in the final piece. The final stage is to cool to room temperature. This process of cooling to room temperature need only proceed slowly enough to prevent shattering.

Devitrification of the glass is a well known occurrence that may happen when glass is heated. Some glass sheets will devitrify in the firings, if a devitrification finish is not preferred, a coat of glass glaze or ceramic paint may be painted or sprayed on top of the glass surface before firing. A preferred glass glaze is made with 50% ethyl alcohol, 10% ground glass, 1% or more trisodium, water, and phosphate by volume.

Thus, referring to FIG. 3, it can be seen that the fused glass sheets with metal foil and ceramic paint can be used for architectural glazing, glass building materials and glass objects. In addition, the surface of the glass sheet is durable, resistant to atmospheric gases and vapors, and has high chemical durability. The metal foil has a significant effect in equalizing temperature variations across the glass sheets as well as adding strength to the glass and remaining aesthetically pleasing. Additionally, by incorporating the ceramic paints along with the metal foils, less oxidization of the metal foil occurs and the glass sheet becomes an aesthetically pleasing product which is stronger. Above all, it is a natural product that can be recycled and is environmentally friendly.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the ceramic tile industry.

I claim:

1. A composite glass sheet comprising:
   first and second translucent glass sheets, said first and second translucent glass sheets having outer facing first principle sides and second principle sides facing toward each other, each of said translucent glass sheets having a peripheral edge,
   a layer of metal foil in the form of a sheet having opposed principle sides positioned between said second principle sides of said first and second translucent glass sheets within the peripheral edges of said first and second translucent glass sheets; and
   first and second layers of ceramic paint extending over at least a portion of the second principle sides of said translucent glass sheets and said opposed principle sides of said metal foil,
   said second principle sides of said first and second translucent glass sheets and said first and second layers of ceramic paint fused together wherever in contact with each other and said opposed principle surfaces of said metal foil bonded to second principle sides of said first and second translucent glass sheets and said first and second layers of ceramic paint fused together wherever in contact with each other.

2. The composite glass sheet as set forth in claim 1 wherein the metal foil has a smaller cross-sectional area than said first and second glass sheets.

3. The composite glass sheet as set forth in claim 2 wherein said metal foil is selected from the group consisting of copper, brass, lead, steel, zinc, titanium, silver, gold and platinum.

4. The composite glass sheet as set forth in claim 3 herein at least one of said first and second layers of ceramic paint contain include pigmentation.

5. The composite glass sheet as set forth in claim 4 wherein the thickness of said metal foil is between 0.0001 to 0.015 inch thick.

6. The composite glass sheet as set forth in claim 5 wherein the thickness of said metal foil is between 0.0001 and 0.006 inch thick.

7. The composite glass sheet as set forth in claim 5, or 6 wherein said ceramic paints comprise glass frits, pigments and a carrier and said pigments are metal oxides selected from the group consisting of zinc, aluminum, tin, antimony, cadmium, chromium, lead, cobalt, copper, manganese, iron, silicon, titanium, tungsten, and bismuth oxide.

8. The composite glass sheet as set forth in claim 7 comprising said glass frits consisting of the group lead borosilcate and soda-lime borosilicate.

9. The composite glass sheet as set forth in claim 8 wherein the concentration of said metal oxide powders is between 1 and 30 percent.

10. The composite glass sheet as set forth in claim 9 wherein the concentration of frits is between 30 to 50 percent.

11. The composite glass sheet as set forth in claim 10 wherein the thickness of said first and second translucent glass sheets is between 0.03 inch to 2.0 inches.

12. The composite glass sheet as set forth in claim 11 wherein at least one of said second principle sides of said first and second translucent glass sheets are textured.

13. A method of making a composite glass sheet comprising the steps of:

providing first and second sheets of translucent glass having first and second principle sides providing a layer of metal foil having first and second principle surfaces;

coating at least a portion of said first principle sides of said first and second sheets with a layer of ceramic paint;

placing said first and second sheets of coated translucent glass on to said first and second sides of said metal foil such that said coated first sides thereof are in contact with said metal foil; forming an assembly; and heating said assembly to a sufficient temperature for a sufficient time such that said first and second coated sheets of glass and said metal foil are fused together.

14. The method as set forth in claim 13 wherein the cross-sectional area of said metal foil is less than the cross-sectional area of said first and second glass sheets.

15. The method as set forth in claim 14 wherein said metal foil is selected from the group consisting of copper, brass, lead, steel, zinc, titanium, silver, gold and platinum.

16. The method as set forth in claim 14 wherein at least one of said first and second layers of ceramic paint contain include pigmentation.

17. The method as set forth in claim 16 wherein the thickness of said metal foil is between 0.0001 to 0.015 inch thick.

18. The method as set forth in claim 17 wherein the thickness of said metal foil is between 0.0001 and 0.006 inch thick.

19. The method as set forth in claim 18, wherein said ceramic paints include metal powders selected from the group consisting of zinc, aluminum, tin, antimony, cadmium, chromium, lead, cobalt, copper, manganese, iron, silicon, titanium, tungsten, and bismuth.

20. The method as set forth in claim 16 wherein the concentration of said metal powder is between 1 and 40 percent.

21. The method as set forth in claim 20 wherein the thickness of said first and second glass sheets is between 0.03 inch to 2.0 inches.

22. The method as set forth in claim 21 wherein said second principle sides of said first and second glass sheets are textured.

\* \* \* \* \*